3,273,679
AUTOMATIC CONTROLS FOR FLUID PRESSURE CLUTCH OPERATOR
Edmond Uher, Cap d'Antibes, France, assignor to Beltomatic Patentverwertungsanstalt, Vaduz, Liechtenstein, a corporation of Liechtenstein
Filed Aug. 10, 1964, Ser. No. 388,623
Claims priority, application Germany, Aug. 9, 1963, U 10,041
1 Claim. (Cl. 192—.052)

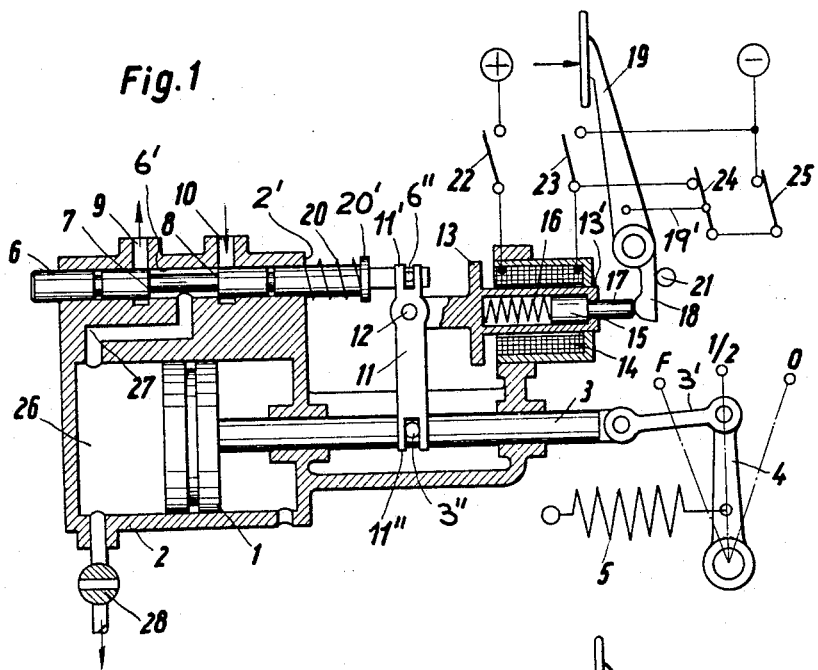
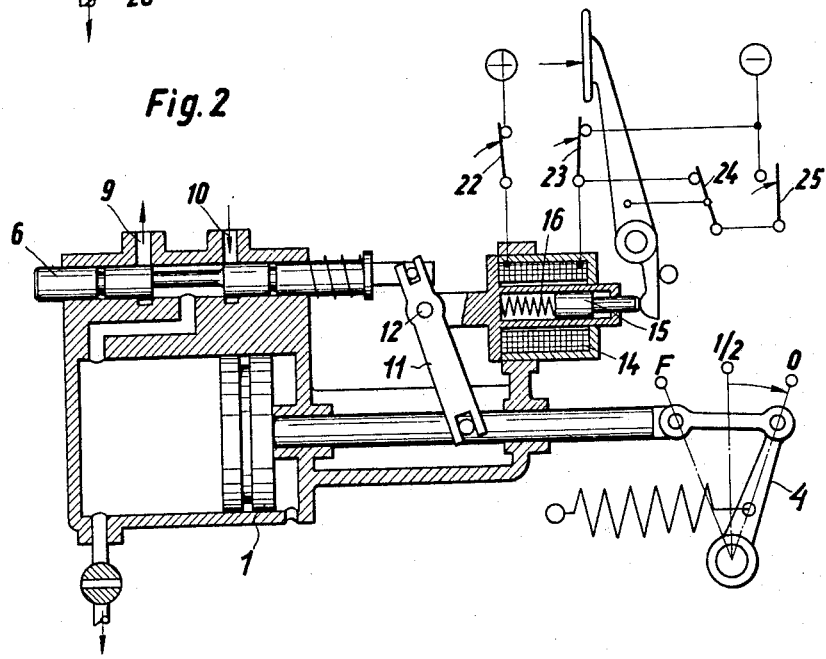

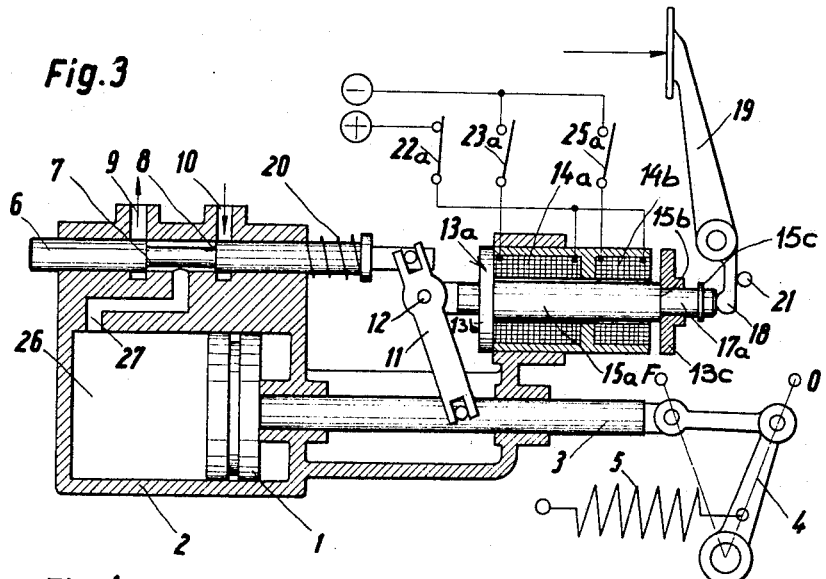
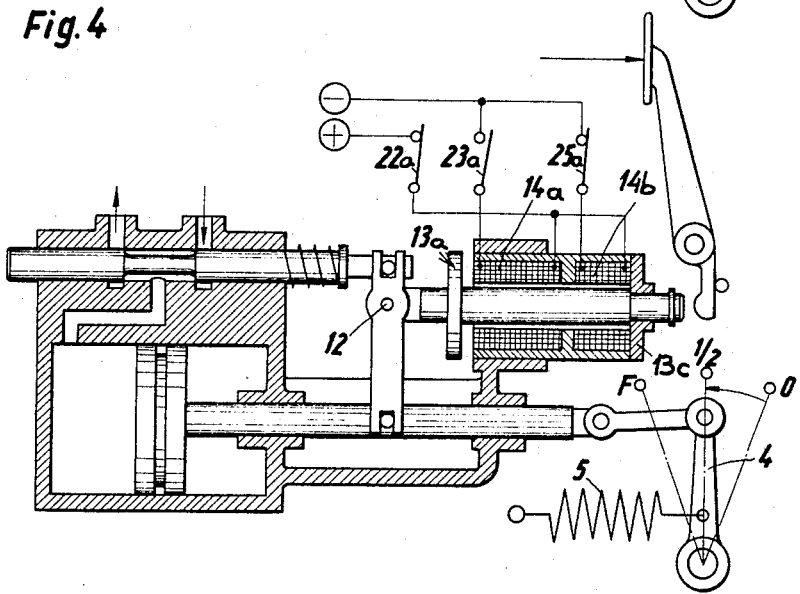

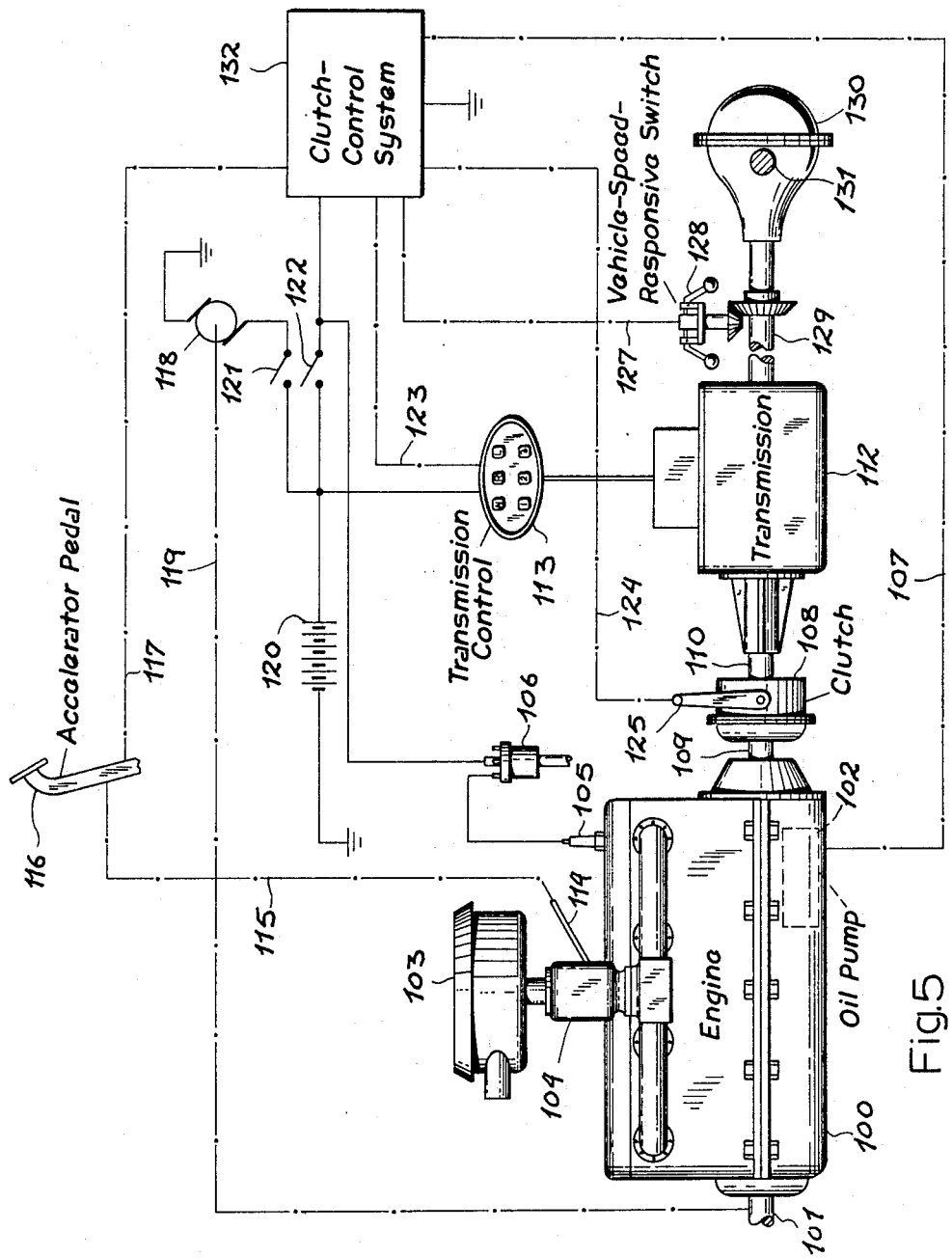

The present invention relates to vehicular-clutch systems for automotive vehicles and, more particularly, to an automatic clutch arrangement enabling the upshifting and down-shifting of a variable-speed transmission without manual displacement of a clutch interposed between the engine and the transmission.

Conventional automotive-clutch systems are characterized by a fluid-responsive clutch arrangement which is controlled by a valve regulating the flow of a hydraulic fluid or compressed air to the clutch. In general, valve systems of this type control the flow cross-section of the fluid. The pressure of the fluid supplied to the clutch is not, however, dependent only upon the cross-section of the valve; especially when hydraulic fluids are involved, the quantity and the viscosity of the medium determine the degree and rate of actuation of the clutch. Since the viscosity is temperature dependent, complex means must be provided to insure that the desired degree of clutch actuation and the optimum rate of actuation are achieved. Conventional clutch systems have, therefore, been provided with special fluid-circulating means which can be put to no other use in the automotive vehicle. Such clutch systems are thus relatively expensive and inordinately complex.

It is the principal object of the present invention, therefore, to provide an improved motor-vehicle automatic-clutch system which can be used in conjunction with conventional clutches and does not require special fluid-supply systems.

A further object of this invention is to provide an automatic-clutch system for automotive vehicles adapted to obviate the aforementioned disadvantages of earlier systems, said system substantially unaffected by temperature variations.

Yet another object of this invention is to provide an automatic-clutch system of the general character described which is substantially unaffected by wide variations in fluid pressure and thus can employ the pressure medium of another appliance normally present in an automotive vehicle for other purposes.

Yet a further object of this invention is to provide an automatic clutch enabling smooth upshifting and down-shifting of an automotive vehicle without special intervention by the vehicle operator, even at elevated speeds, and adapted to enable nonslip coupling of the driving and driven shafts without detrimental effects on the clutch spring.

These objects and others which will become apparent hereinafter are attained, in accordance with the present invention, by a vehicular-clutch system for an automotive vehicle wherein a clutch is interposed between the output shaft of an engine and the input shaft of a variable-speed transmission, the clutch system comprising a control arrangement responsive to actuation of the accelerator means or gas pedal, the vehicular speed, and energization of the transmission to vary the transmission ratio. The clutch system of the present invention thus comprises a servomotor means, e.g. a fluid-responsive piston-and-cylinder arrangement, connected with the actuating element (e.g. lever or pedal) of a conventional clutch for shifting the latter between first and second positions, wherein the transmission is respectively decoupled from the engine and fully coupled therewith, through at least one intermediate position (wherein the clutch partially couples the engine with the transmission. The servomotor means is preferably adapted to maintain the actuating element of the clutch normally in this first position in an operative condition of the engine. First operating means is provided to connect the accelerator means (i.e. the gas pedal) with the servomotor means for controlling the latter in dependence upon the actuation of the accelerator means. Second operating means, responsive to the speed of the vehicle, is connected with the servomotor means and controls the latter in dependence upon the vehicular speed; this second operating means should be capable of energizing the servomotor means to shift the actuating element of the clutch at least into this intermediate position upon the speed of the vehicle exceeding a predetermined minimum (e.g. 15 km./hour). A third operating means connects the transmission and the servomotor means for temporarily energizing same to shift the actuating element toward the first position upon actuation of the transmission to alter the transmission ratio (i.e. change gears) thereof. It will be evident, therefore, that the energization of the engine, with the gas pedal undepressed and the vehicle at standstill, will automatically result in the actuating element of the clutch being in the first position wherein the engine is decoupled from the transmission, thereby preventing undesirable movement of the vehicle. When the gas pedal is depressed, however, the servomotor means is operated to displace the actuating element from its first position toward the second position through the intermediate positions of the clutch, whereupon the latter couples the engine with the transmission and can set the vehicle into movement. Further depression of the gas pedal increases the degree of coupling so that the decreased slippage between driving and driven shafts is proportional to the speed of the vehicle.

When the transmission is actuated to shift from a low speed to a higher speed, the operation of the transmission automatically engages the third operating means to temporarily energize the servomotor means in a sense tending to decouple the engine from the transmission so that shifting can be carried out without strain on the transmission. At elevated vehicle speeds, however, the second operating means comes into play to prevent decoupling of the transmission from the engine even when the accelerator pedal is released, thereby enabling the engine to brake the vehicle; this is especially important during downhill travel. The third operating means, however, remains effective so that, even during downhill travel, actuation of the transmission (e.g. to downshift) will temporarily decouple the engine from the transmission. When the engine is de-energized, the clutch-control system operates to insure that the clutch-actuating element is in a position removed from the first position so that the engine shaft is at least partially coupled with the transmission, thereby enabling the engine to supplement the parking brake or parking gears.

The fluid-responsive servomotor is, according to this invention, of the negative-feedback type whereby any displacement of the piston of the servomotor means concurrently acts upon the valve means through which the fluid medium for the servomotor means is regulated, in a sense tending to halt further movement of the piston and, therefore, the clutch-actuating element or even in a sense tending to reverse this movement. The clutch-control system is, therefore, independent of fluctuations in the available fluid pressure (as long as this pressure is above the minimum necessary to actuate the piston-and-cylinder arrangement; thus the fluid medium can be derived from fluid sources generally present in the automotive vehicle. It is evident, therefore, that the fluid medium can be a liquid such as the lubricating oil of the vehicle, whereupon the clutch system can be supplied with the hydraulic fluid by the lubricating-oil circulating pump of the vehicle. Alternatively, a power-steering system may provide the medium or the latter can be supplied by the air brake compressor, a hydraulic power-brake arrangement or any other source of fluid under positive or negative pressure in the vehicle. The negative feedback also insures that temperature variations and changes in viscosity will not affect the operation of the brake-control system. The clutch may be of any conventional type, since the ordinary actuating element of this clutch is coupled with servomotor means; there is no need to employ a specially designed fluid-operated coupling or the like.

According to a more specific feature of the present invention, the first operating means—whereby movement of the accelerator is transmitted to the valve for regulating the flow of medium to and from the servomotor—includes a connecting member interposed between the accelerator means, and a valve member for shifting the latter upon actuation of the accelerator means by the vehicle operator. An electromagnetic means advantageously cooperates with the connecting member, which can be an armature for a solenoid or the like. The electric circuit for energizing the solenoid preferably has at least one switch in circuit therewith and operated by a conventional centrifugal governor responsive to the speed of the vehicle for triggering the switch upon the speed of the vehicle exceeding the predetermined minimum mentioned above. The electromagnetic means is thus energizable to shift the valve member in the same direction as actuation of the accelerated pedal tends to displace it. Advantageously, the coupling between the accelerator pedal and the connecting member is of the loose and/or lost-motion type so that detection by the governor of the speed in excess of the predetermined minimum will automatically insure that the valve member is shifted to such position that the piston of the servomotor maintains the clutch-actuating element out of its first or decoupling position. The solenoid can thus be either in a normally energized or in a normally de-energized state depending upon whether the switch operated by the governor means is normally closed or open. One terminal of the solenoid means can be connected in circuit with a pair of switch contacts operated upon the turning on of the ignition switch whereby the clutch system is brought into its normal operating condition from its "parking" condition upon energization of the engine.

According to still another feature of this invention, the circuit means can include a further switch in series with the first-mentioned switch and constituting part of the first operating means, this further switch being operated by the accelerator pedal upon energization thereof to release or inactivate the solenoid and enable displacement of the connecting member or armature by the gas pedal. In a particularly advantageous arrangement of the control system, these switches are of the normally closed type and are connected in series with the other terminal of the electromagnetic means. A third switch, of the normally open type and constituting part of the third operating means, can then be connected in shunt across the first-mentioned switch and the further switch, this third switch being temporarily closed by the transmission device upon actuation thereof to alter the transmission ratio. It will be evident, therefore, that operation of the transmission will energize the electromagnetic means in a sense tending to displace the connecting member in the opposite direction from that in which it is displaced by the accelerator pedal to shift the clutch-actuating element toward its first position and enable gear change.

The negative feedback from the piston of the servomotor to the valve member can be achieved by means of a link member in the form of a double-arm lever, pivotally connected at spaced-apart locations to the valve member and the piston member; this double-arm lever has a floating fulcrum intermediate these locations shiftable by the electromagnetic means. The armature of the electromagnetic solenoid can thus be pivotally connected to this link member at this fulcrum between the spaced-apart locations. In an alternative construction of the device, the electromagnetic means comprises two solenoid coils surrounding the armature and adapted to displace it upon energization of the coils, one of these coils being connected in series with a normally open switch operated by the governor means, while the other is connected in circuit with a normally open switch temporarily closable upon gear-changing operation of the transmission. The magnetic force of the first coil is, according to this feature of the present invention, less than the magnetic force of the latter coil, while the coils are poled to displace the armature in opposite directions upon energization. In this case, the switch means actuatable by the accelerator pedal need not be provided. The dual-magnet arrangement is designed to insure a more positive displacement of the actuating element from a stage in which the clutch is in an intermediate coupling condition and the first position described above.

The above and other objects, features and advantages of the present invention will become more readily apparent from the following description, reference being made to the accompanying drawing in which:

FIG. 1 is an axial cross-sectional view schematically illustrating a clutch-control system according to the present invention;

FIG. 2 is a view similar to FIG. 2 of the same system in a different position of actuation;

FIG. 3 is a similar view of another embodiment of the present invention;

FIG. 4 is a view similar to FIG. 3 of the clutch-control system thereof in a different operating state; and FIG. 5 is a diagrammatic illustration of the essential parts of an automotive vehicle with which the clutch systems of FIGS. 1–4 can co-operate.

Referring first to FIG. 5, it will be seen that an automotive vehicle, according to the present invention, comprises the usual internal-combustion engine 100 whose crankshaft 101 can drive the usual fan belt, water pump and generator; the engine is also provided with an oil pump 102 for a conventional lubricating-oil circulating system. The clutch-control system of the present invention, generally designated with the reference numeral 132, is supplied with fluid by the oil pump 102 and discharges into the reservoir of the latter as schematically illustrated by the dot-dash line 107. Engine 100 is provided with the usual carburetor 104 supplied with air from an air-cleaner arrangement 103 and having an acceleration-control rod 114 actuated by the accelerator pedal 116 via a linkage schematically illustrated at 115. The ignition system for the engine comprises the customary spark plugs (one of which is diagrammatically shown at 105) and distributor 106 connected in series with an ignition switch 122 and a vehicle battery 120. A starter switch 121 is also provided to energize the starting motor 118, which is coupled via the usual gearing 119, with the crankshaft 101. The output shaft 109 of the engine is connected with the driving element of a conventional clutch 108 whose actuating arm is shown at 125. As will be described in greater detail hereinafter, this actuating arm or element 125 is connected via a linkage 124 with the clutch-control system 132.

The output shaft 110 of clutch 108 is connected to the driven element of the latter and feeds into a variable-speed transmission 112 which can be of the electrically operable, pushbutton type in which the speeds of the transmission are selected on a panel 113. For the purposes of the present invention, the transmission-control panel 113 is shown to be connected with the clutch-control system via a linkage 123, although it is to be understood that any conventionally manually shiftable transmission will operate equally well for the present purposes and may be substituted, the shifting element of the transmission being then connected, as generally illustrated by the linkage 123, with the clutch-control system. The output shaft 129 of the transmission provides the motive power for the differential 130 whose wheel shafts 131 can rotate the rear wheels of an automotive vehicle in the conventional manner. Shaft 129 is thus considered to rotate in step with the vehicle speed so that the governor 128 driven by shaft 129 can be considered responsive to vehicle speed and can be of any conventional type adapted to operate a switch constituting part of the clutch-control system 132 as schematically shown by the dot-dash line 127. The apparatus of FIG. 5 can be used with the clutch-control systems illustrated in FIGS. 1–4 as will be apparent hereinafter.

Referring now to FIGS. 1 and 2, it will be seen that a clutch system according to the present invention comprises a servo-mechanism whose piston 1 is reciprocable in the cylinder 2 under the action of a hydraulic fluid or other medium supplied from the source of fluid pressure to the cylinder via an inlet 10 and returned to the hydraulic system via outlet 9. Piston 1 is provided with a piston rod 3 which is coupled with the actuating element 4 of a clutch via a linkage 3'. This actuating element 4 can be considered to be equivalent to the arm or lever 125 of the apparatus illustrated in FIG. 5. Actuating element 4 is biased in the counterclockwise sense by a tension spring 5 which tends to shift the actuating element from its first ("0" or zero) toward its second ("full" coupling or "F") position. Fluid pressure supplied to the chamber 26 of servocylinder 2 on the left-hand side of piston 1 tends to act counter to the spring 5 and shift the actuating element 4 from its second to its first position.

The pressure medium for operating the piston 1 of the servomotor is controlled by a valve means including a longitudinally displaceable valve member 6 which is reciprocable parallel to the axis and direction of reciprocation of piston 1 and its rod 3. The valve member 6 is shiftable in a valve bore 6' with which the inlet 10 and the outlet 9 for the pressure medium communicate. The valve member 6 is provided with a pair of control edges or faces 7, 8 adapted to block the flow from chamber 26 to the outlet 9 and from the inlet 10 to chamber 26, respectively; when these edges 7, 8 are displaced so as to permit the respective fluid flows, the compartment between these edges forms a chamber through which the pressure medium passes to and from the connecting passage 27 and the cylinder chamber 26. The edges 7 and 8 are so arranged that, when one of the edges permits the flow of fluid to or from the chamber, the other blocks the flow in the opposite direction.

As previously mentioned, the clutch-control system is of the negative-feedback or "after-running" type wherein each displacement of the valve member effecting movement of the piston results in an actuation of the valve member by the piston to counter the operation of the valve member. According to the present invention, the negative feedback is provided by way of link member in the form of a double-arm lever 11, one of whose bifurcated extremities 11' is pivotally connected, by a pin 6", with the valve member 6. The other extremity 11" of this double-arm lever pivotally receives a pin 3" carried by the piston rod 3. A floating fulcrum is provided for the lever 11 and is shiftable parallel to the direction of displacement of the valve member 6 and the piston 1. This fulcrum is formed intermediate the pivotal junctions of the lever with the valve member and the piston member by swingably joining the lever to a connecting or armature member, generally designated 13. This latter member is magnetically attractable by a solenoid coil 14 constituting with the armature 13, the electromagnetic means of this embodiment.

When the coil 14 is energized, as will be apparent hereinafter, the connecting member 13 is shifted to the right to displace the floating pivot 12 and the valve member 6 in this direction, i.e. in a direction tending to permit flow of fluid under pressure to the cylinder chamber 26, thereby driving the piston 1 to the right and progressively disengaging the clutch by movement of its actuating arm 4 toward its first position "0." The tubular connecting member 13 slidably receives a pin 15, which is yieldably biased to the right by a spring 16, this pin 15 having an abutment stud 17 projecting outwardly of the tubular portion 13' of the connecting member 13 into the path of a lever arm 18 carried by the gas or accelerator pedal 19. It will be understood that the accelerator pedal 19 is identical with that designated 116 in FIG. 5 or can be another lever coupled with a separate accelerator pedal 116 via a linkage such as that diagrammatically represented at 117. For the purposes of the present invention, the linkage 117 can be equated with lever arm 18 of FIGS. 1–4. The valve member 6 is biased to the right by a compression spring 20, seated against the cylinder housing 2' and a shoulder 20' carried by the valve member 6. Spring 20 has a compressive force which is less than that of spring 16, the gas pedal 19 being held in its inoperative position against abutment 21 by both of these springs.

The electrical networks provided for energizing or de-energizing the solenoid coil 14 includes a switch 22 connected with the positive terminal of the direct-source, i.e. battery 120 of the automotive electrical system (FIG. 5) and ganged with the switch 122 of the ignition system so that, concurrently with actuation of the ignition switch, switch 22 is closed to provide a closed circuit through this switch to the solenoid coil 14. The negative terminal of the battery or ground is connected to the other terminal of the solenoid 14 by a pair of series-connected switches 24 and 25 of the normally closed type. A normally open switch 23 is connected in shunt with switches 24 and 25. Switch 25 is operated by the governor 128 directly or via a mechanical or electrical linkage represented by the dot-dash line 127; this switch thus constitutes part of the second operating means responsive to the speed of the vehicle (via the centrifugal governor) and remains closed as long as the speed of the vehicle is less than a predetermined minimum, preferably about 15 km. per hour. The governor, however, opens the switch 25 when the vehicle speed exceeds the 15 km. per hour level.

The first operating means of the present invention includes the switch 24 which is coupled with the accelerator pedal 19 mechanically, i.e. via an articulated linkage 19', and remains closed as long as the accelerator pedal is inactivated. When this pedal is depressed, however, switch 24 is opened. The third operating means includes the switch 23 which is connected to the transmission system as diagrammatically represented by the dot-dash line 123 for temporary closure during the period of shifting of the transmission. After the shifting process is completed, switch 23 re-opens.

When the floating fulcrum 12 of the lever 11 is shifted by the accelerator pedal or the electromagnetic means, the servo-piston 1 follows this movement until lever 11 so displaces the valve member 6 that the valve member 6, piston 1 and actuating element 4 again reach the intermediate position ("½") as illustrated in FIG. 1. It will be evident, therefore, that the movement of the fulcrum 12, which requires little force, is reproduced by movement of the piston under considerable hydraulic force. The lengths of the armature and stud constituting the connecting member 13 are so selected that, in the inoperative position of the accelerator pedal 19, the floating fulcrum 12 is so disposed as to maintain the actuating element 4 in an intermediate position in which the clutch can be half engaged. When the electromagnetic means is energized to attract the armature (FIG. 2), the actuating element 4 is shifted to its first or "0" position in which the clutch is fully disengaged. When the solenoid coil 14 is unenergized and the gas pedal 19 is depressed, the connecting member 13 is mechanically shifted to the left and the actuating element 4 progressively displaced toward its second position with increasing engagement of the clutch.

The operation of the device of FIGS. 1 and 2 is as follows:

In a stationary or parking position of the vehicle, operation of the ignition switch closes contact 22 and energizes the solenoid coil 14 via the normally closed contacts 24 and 25. The connecting member or armature 13 is then shifted to the right (FIG. 2) to displace the valve member 6 in this direction and permit fluid to flow from inlet 10 into the cylinder chamber 26 and displace the piston 1 toward the right (thereby opening the clutch and permitting the transmission to be shifted from any previous gearing arrangement into the first drive position). Depression of the accelerator pedal 19 after placing the vehicle "in gear," opens switch 24 and thereby de-energizes the solenoid 14, so that under the action of the accelerator pedal 19 and the relatively strong spring 16, the floating fulcrum 12 and the valve member 6 are displaced to the left; fluid then flows from chamber 26 through outlet 9 while the spring 5 swings the actuating element 4 counterclockwise until lever 11 displaces the valve member to cut off further flow of fluid. The clutch-control system is then in the position illustrated in FIG. 1 wherein the clutch is half closed. It should be understood that only a minimum displacement of the accelerator pedal is required to accomplish the foregoing chain of events and further mechanical displacement by lever arm 18 of the connecting member 13 has not yet occurred.

If it is necessary to provide more fuel to the engine, the accelerator pedal is now depressed and the connecting member 13 is mechanically displaced further to the left, to permit the flow of fluid again from chamber 26 through outlet 9 and the displacement of the piston 1, under the action of spring 5, to the left and further close the clutch. When it is desired to vary the transmission ratio or shift gears, the transmission-shifting arm (via a conventional mechanically operated interruptor switch) or the transmission control 113 simultaneously actuates the switch 23 as diagrammatically indicated by dot-dash line 123; switch 23 is closed only as long as the gear-change process is being carried out. Closure of switch 23 again energizes the solenoid coil 14 and shifts the armature 13 to the right (FIG. 2) to bring the actuating lever 4 into its "0" or off-position. This operation is supplemented by release of the accelerator pedal so that spring 20 biases the valve member 6 and connecting member 13 to the right until the accelerator pedal strikes the abutment 21; release of the gas pedal in this manner automatically results in a shifting of the servomotor and actuating element into the half-closed condition of the clutch even if the vehicle is traveling at an elevated speed or had been in a state of greater clutch closure just prior to gear change.

At the conclusion of the gear-changing operation, switch 23 is again opened so that, if the accelerator pedal remains undisplaced, the clutch system returns to the position ("½") illustrated in FIG. 1 in which the clutch is half closed. This insures a relatively gentle and jolt-free coupling of the engine with the transmission; the clutch can be brought into a full-coupling state by depression of the accelerator pedal to mechanically shift the connecting member 13 and the valve member 6 to the left against the force of spring 20. As long as the vehicle operates at a relatively elevated speed, i.e. a speed in excess of 15 km./hr., contact 25 is held opened so that, except for gear changing, solenoid coil 14 remains de-energized, thereby insuring that the clutch is at least half engaged (FIG. 1) regardless of the position of the gas pedal. The engine is thus always coupled with the vehicle wheels during operation at vehicle speeds above 15 km./hr., thereby insuring engine-braking of the vehicle at vehicle speeds in excess of the indicated minimum. As the vehicle is braked to standstill, its speed falls below 15 km./hr., and switch 25 is closed, thereby energizing the coil 14 (FIG. 2) to shift the actuating element 4 into its first position in which the clutch is decoupled. If the engine is then turned off, solenoid 14 is de-energized via switch 22 and spring 5 displaces the actuating element 4 to an engaged position, driving fluid from chamber 26 by a leakage path around the piston or through an outlet provided with a valve 28 coupled, for instance, with the parking brake. Thus the system will be in the position illustrated in FIG. 1 when the engine is inactivated and serves to couple the engine with the transmission to prevent free-wheeling of the latter should the parking brake slip. It is also a feature of the present invention to provide a clutch pedal or clutch device which will operate the valve 28 independently. When valve 28 is opened, piston 1 shifts to the left under the force of spring 5 and engages the clutch. Closure of valve 28 permits a pressure build-up in chamber 26 and also shifting of the actuating element to the right.

The clutch-control system of the present invention permits operation of a motor vehicle at high efficiencies and with less fuel since the partially closed clutch can be carefully regulated and only partly closes automatically after gear change. The transmission and engine can thus be operated with optimum speeds. Gear change can also be carried out at high speeds with up-shifting and down-shifting free from jolts since a rapid depression of the accelerator pedal closes the clutch immediately without resulting in racing of the engine. An additional advantage resides in the fact that no special displacement pump is required for the fluid medium since it can be connected to the lubricating system of the automobile or to the usual engine suction line. In trucks or the like, the source of fluid can be the vehicular hydraulic or pneumatic systems.

In the system of FIGS. 3 and 4, portions identical to those of the embodiment of FIGS. 1 and 2 have identical reference numerals, while similarly functioning parts with different structures have been given the same reference numerals followed by a letter (e.g. a, b, etc.). In the system of FIGS. 3 and 4, the connecting member 13a is provided with a pair of disk-shaped magnetic armatures 13b and 13c, the central portion 15a of the connecting member being solid and provided with the stud 17a with which the armature 13c forms a lost-motion connection between the shoulder 15b and a split spring 15c. The lever arm 18 of pedal 19 bears upon the stud 17a as described with reference to the stud 17 of FIGS. 1 and 2. The switch 22a is also ganged with the ignition switch of the vehicle (FIG. 5) and connects a pair of coils 14a, 14b in parallel with the positive terminal of the battery 120. These coils 14a and 14b surround the solid portion 15a of connecting member 13a and are oppositely poled to attract the armatures 13a and 13c to the right and left, respectively. Switch 23a is temporarily energized by the transmission system during the gear-change operation while switch 25a is operated by the centrifugal governor 128; both switches are normally open and are connected between the negative terminal of the battery and the respective solenoids 14a and 14b. The length of the connecting element 13a between the fulcrum 12 and the right-hand extremity of stud 17a is so selected that, when the accelerator pedal 19 and the electromagnets 14a, 14b are inactive, the position of the floating fulcrum 12 is such that the piston 1 maintains the actuating arm 4 of the clutch in its first or decoupled position.

The operation of the clutch system of FIGS. 3 and 4 is as follows:

As soon as gas pedal 19 is depressed, the connecting member 13a is shifted to the left to displace the floating fulcrum 12 in this direction and release fluid from the chamber 26 to the outlet 9. The spring 5 then draws the actuating element 4 of the clutch in the counterclockwise sense to engage the clutch to an extent determined by the position of floating fulcrum 12 and thus the extent of depression of accelerator pedal 19. The engine is thus coupled with the transmission and the vehicle set in movement. When the vehicle speed exceeds the 15 km./hr. level, switch 25a is closed by the centrifugal governor 128 and energizes the coil 14b whose magnetic force is less than that of coil 14a when energized. Armature 13c is then attracted to the left and engages the shoulder 15b to entrain the connecting member 13a in this direction. This position of the connecting member is maintained even when the gas pedal is released so that the clutch can then be fully decoupled by such release of the gas pedal at vehicle speeds above the predetermined minimum. This is especially important for downhill travel in which the engine braking is desired even when the accelerator pedal is released. The attraction of armature 13c by coil 14b does not, however, prevent depression of the accelerator pedal 19 from displacing the connecting member 13a further to the left in order to increase the engagement of the clutch. Since armature 13c is slidable on the stud 17a and forms a lost-motion connection therewith, member 13a can be displaced to the left until the ring 15c engages the armature 13c.

When switch 23a is closed by the transmission system as described in connection with switch 23, solenoid coil 14a is energized and, since its magnetic force exceeds that of coil 14b, attracts the armature 13b and draws it and the connecting member rigid therewith to the right, provided the accelerator pedal has been released. The piston 1 is now shifted to the right and disengages the clutch (FIG. 3). At the conclusion of the gear-changing operation, switch 23a is again open so that coil 14a is de-energized. If the vehicle is in motion, as is generally the case, and its speed exceeds 15 km./hr., switch 25a remains closed and de-energization of coil 14a permits the connecting member 13a to shift to the left, thereby bringing the system into the position illustrated in FIG. 4 wherein, even without depression of the gas pedal, the clutch is partly engaged and racing of the engine is precluded. Depression of the accelerator pedal, however, enables adjustment of the clutching force.

The invention as described and illustrated is believed to admit of many modifications and variations within the ability of persons skilled in the art, all such modifications and variations being deemed to be included within the spirit and scope of the appended claims.

What is claimed is:

In a vehicular-clutch system for an automotive vehicle provided with an engine, a variable-speed transmission coupled with said engine, a clutch interposed between said transmission and said engine and having an actuating element for shifting said clutch between a first position wherein said transmission is decoupled from said engine and a second position wherein said transmission is fully coupled with said engine, and operator-controlled accelerator means for selectively varying the speed of said engine, the improvement which comprises:

(a) servomotor means operatively connected with said actuating element for shifting the latter between said first and second positions through at least one intermediate position wherein said clutch partially couples said engine with said transmission but normally maintaining said element in said first position in an operative condition of said engine;

(b) first operating means connecting said accelerator means with said servomotor means for controlling same in dependence upon the actuation of said accerelator means and energizing said servomotor means to shift said element to said second position upon actuation of said accelerator means to increase the speed of said engine;

(c) second operating means responsive to the speed of said vehicle and connected with said servomotor means for controlling same in dependence upon a speed of the vehicle and energizing said servomotor means to shift said element at least into said intermediate portion upon the speed of said vehicle exceeding a predetermined minimum; and (d) third operating means connected with said transmission and said servomotor means for temporarily operating same to shift said element toward said first position upon actuation of said transmission to alter the transmission ratio thereof, said servomotor means comprising a fluid-responsive piston-and-cylinder arrangement and valve means for regulating the flow of a medium to and from said arrangement, said valve means including a shiftable valve member for regulating the flow of said medium to said arrangement, said first operating means including a connecting member interposed between said accelerator means and said valve member for shifting the latter upon actuation of said accelerator means by the vehicle operator, and electromagnetic means co-operating with said connecting member and energizable to shift said valve member in a sense tending to operate said piston-and-cylinder arrangement so that said element is displaced toward said first position, said second operating means includes an electric circuit connected with said electromagnetic means and having at least one switch in circuit therewith, and governor means responsive to the speed of said vehicle for operating said switch upon the speed of said vehicle exceeding said predetermined minimum, said circuit including a further switch in series with the first-mentioned switch and constituting part of said first operating means, both of said switches being normally closed with said first-mentioned switch being opened by said governor means upon the speed of the vehicle exceeding said predetermined minimum and said further switch being opened by said acelerator means upon actuation thereof by the vehicle operator.

References Cited by the Examiner

UNITED STATES PATENTS

| 2,571,162 | 10/1951 | Price et al. | 192—.052 |
| 2,587,524 | 2/1952 | Price | 192—.052 |
| 2,589,628 | 3/1952 | Price | 192—.076 |
| 2,605,872 | 8/1952 | Prather | 192—.052 |

DAVID J. WILLIAMOWSKY, *Primary Examiner.*

BENJAMIN W. WYCHE III, *Examiner.*